US007555138B2

(12) United States Patent
Paxson

(10) Patent No.: US 7,555,138 B2
(45) Date of Patent: Jun. 30, 2009

(54) METHOD AND APPARATUS FOR DIGITAL WATERMARKING FOR THE ELECTRONIC LITERARY MACRAMÉ

(76) Inventor: Dana W. Paxson, 129 Glen Haven Rd., Rochester, NY (US) 14609

( * ) Notice: Subject to any disclaimer, the term of this patent is extended or adjusted under 35 U.S.C. 154(b) by 6 days.

(21) Appl. No.: 11/782,976

(22) Filed: Jul. 25, 2007

(65) Prior Publication Data

US 2008/0025559 A1 Jan. 31, 2008

Related U.S. Application Data

(60) Provisional application No. 60/909,197, filed on Mar. 30, 2007, provisional application No. 60/833,201, filed on Jul. 25, 2006.

(30) Foreign Application Priority Data

Feb. 26, 2007 (WO) ............... PCT/US2007/062801

(51) Int. Cl.
- G06K 9/00 (2006.01)
- G06F 17/00 (2006.01)
- G06F 17/20 (2006.01)
- G06F 17/21 (2006.01)
- G06F 17/22 (2006.01)
- G06F 17/24 (2006.01)
- G06F 17/25 (2006.01)
- G06F 17/26 (2006.01)
- G06F 17/27 (2006.01)
- G06F 17/28 (2006.01)

(52) U.S. Cl. ...................................... 382/100; 715/206
(58) Field of Classification Search ................. 382/100; 713/176, 193; 715/254–256, 205–208
See application file for complete search history.

(56) References Cited

U.S. PATENT DOCUMENTS

| | | | | |
|---|---|---|---|---|
| 5,901,332 | A | * 5/1999 | Gephardt et al. | 710/41 |
| 6,314,415 | B1 | * 11/2001 | Mukherjee | 706/47 |
| 6,966,029 | B1 | * 11/2005 | Ahern | 715/234 |
| 6,968,455 | B2 | * 11/2005 | Okayasu et al. | 713/176 |
| 7,240,209 | B2 | * 7/2007 | Carro | 713/179 |
| 2001/0039002 | A1 | * 11/2001 | Delehanty | 434/322 |
| 2002/0078343 | A1 | * 6/2002 | Rubin et al. | 713/153 |
| 2002/0118860 | A1 | * 8/2002 | Pasqua | 382/100 |
| 2002/0152245 | A1 | * 10/2002 | McCaskey et al. | 707/530 |
| 2002/0178185 | A1 | * 11/2002 | Kuchinsky et al. | 707/512 |
| 2003/0078888 | A1 | * 4/2003 | Lee et al. | 705/51 |
| 2003/0190054 | A1 | * 10/2003 | Troyansky et al. | 382/100 |
| 2004/0091132 | A1 | * 5/2004 | Eguchi et al. | 382/100 |
| 2005/0019740 | A1 | * 1/2005 | Cunningham et al. | 434/350 |
| 2005/0055624 | A1 | * 3/2005 | Seeman et al. | 715/500 |
| 2006/0075241 | A1 | * 4/2006 | Deguillaume et al. | 713/176 |
| 2007/0204211 | A1 | 8/2007 | Paxson | |
| 2008/0027822 | A1 | 1/2008 | Paxson | |
| 2008/0028297 | A1 | 1/2008 | Paxson | |
| 2008/0037879 | A1 | 2/2008 | Paxson | |
| 2008/0216022 | A1 | * 9/2008 | Lorch et al. | 715/847 |

* cited by examiner

Primary Examiner—Yubin Hung
(74) Attorney, Agent, or Firm—Thomas R. FitzGerald; Hiscock & Barclay, LLP

(57) ABSTRACT

An embodiment of digital watermarks which contains literary information of interest to a reader of an electronic literary macramé (ELM) or a knowledge transfer tool (KTT). The nature of the watermark changes by the deepening of its role in the ELM/KTT, since the watermark becomes what is termed in cryptographic parlance a "side channel" for conveying narrative-related information to a reader outside the primary communications stream. If a reader removes the digital watermark from the work, the side channel containing narrative-related information is destroyed, and the literary value of the work is thereby diminished.

19 Claims, 6 Drawing Sheets

METHOD AND APPARATUS FOR DIGITAL WATERMARKING FOR THE ELECTRONIC LITERARY MACRAMÉ

REFERENCE TO RELATED APPLICATIONS

This application claims the benefit of U.S. Provisional Application No. 60/833,201, filed Jul. 25, 2006, and U.S. Provisional Application No. 60/909,197, filed Mar. 30, 2007, both of which are hereby incorporated by reference. This application also claims the benefit of PCT Application No. PCT/US2007/062801, filed Feb. 26, 2007, which is hereby incorporated by reference. Reference is also made to the following related applications: U.S. Nonprovisional Application No. 11/361,439, filed Feb. 24, 2006, entitled "Apparatus and Method for Creating Literary Macramés"; U.S. Nonprovisional Application No. 11/828,083, filed Jul. 25, 2007, entitled "Method and Apparatus for Electronic Literary Macramé Component Referencing," attorney docket no. 305466-301883US03; U.S. Nonprovisional Application No. 11/828,238, filed Jul. 25, 2007, entitled "Method and Apparatus for Presenting Electronic Literary Macramé on Handheld Computer Systems," attorney docket no. 305466-301883US04; and U.S. Nonprovisional Application No. 11/828,010, filed Jul. 25, 2007, entitled "Method and Apparatus for Electronic Literary Macramé Business Development," attorney docket no. 305466-301883US05, which are all hereby incorporated by reference.

AREA OF THE INVENTION

This disclosure relates to the creation and reading of texts readable on computers, and more specifically to the creation of interconnected narratives and references readable using browser programs such as those adapted for use on the World Wide Web.

BACKGROUND OF THE INVENTION

To illustrate and provide background for the present method and apparatus, the patent application titled "Apparatus and Method for Creating Literary Macramés", U.S. patent application Ser. No. 11/361,439, by the present inventor, is incorporated herein by reference. A literary macramé, also called here an 'ELM', or electronic literary macramé, is a form of text offering readers advantages over other forms of literature in referencing and tracing connections.

To provide further background and support for the present method and apparatus, the patent application titled "The Knowledge Transfer Tool: An Apparatus And Method For Knowledge Transfer", International Application No. PCT/US2007/062801, also by the present inventor, is also incorporated herein by reference. The Knowledge Transfer Tool, also called here a 'KTT', combines ELM characteristics and capabilities with rule-based expert system and programmed-instruction components to allow authors to produce immersive learning programs in literary and textbook forms on electronic media.

To provide context for ongoing developments relating to the present method and apparatus, the patent applications titled "Method And Apparatus For Electronic Literary Macramé Component Referencing", "Method And Apparatus For Electronic Literary Macramé Business Development", and "Method For Presenting Electronic Literary Macramés On Handheld Computer Systems", also by the present inventor, are additionally incorporated herein by reference.

A digital watermark is a distinctive identifying pattern or encoding applied to an electronic file or work to distinguish one copy, version, or source of the work from another. Effective digital watermarks have the additional properties that they are: 1) sufficiently unobtrusive to present no distraction or obstacle to the target audience of the work, and 2) sufficiently difficult to remove from the work that the effort needed for removal outweighs the advantages of that removal.

Literary works published or read in electronic form are easy to copy. The ease of copying presents an obstacle to an author or publisher who wishes to profit from publishing a work electronically. Many copy-protection schemes are well-known in the art of electronic publishing, but with sufficient time and resources, all can be broken. Those who wish to profit from the sale or presentation of electronic literary works must find ways of discouraging copyright violation while avoiding the kinds of fiascos which have plagued vendors using copy-protection tools. The rootkit scandal perpetrated by a copy-protection software supplier on behalf of Sony Corporation is a salient case.

Digital watermarks are now a conventional technology, installed in many forms in many types of copyrightable electronic works, and provided by numerous vendors. They constitute a limited form of copy protection, in that their presence can identify copies or sets of copies of a literary work. If a copy containing a digital watermark is furnished by a publisher to a buyer, the contents of that copy's watermark may be used to associate the copy with the buyer, so that additional copies appearing with the same watermark may be considered illegal copies originated from the buyers copy. The buyer may then be held accountable for the copyright violation.

Despite measures taken to prevent removal, a digital watermark may be removed from an electronic literary work, rendering the work untraceable to a buyer. Those wishing to benefit from the limited copyright protection afforded by digital watermarks would benefit from an invention that reduces the attractiveness of removal of the digital watermark.

SUMMARY OF THE INVENTION

The present method and apparatus provide an embodiment of digital watermarks which contains literary information of interest to a reader of an electronic literary macramé (ELM) or a knowledge transfer tool (KTT). The present method and apparatus change the nature of the watermark by deepening its role in the ELM/KTT, since the watermark becomes what is termed in cryptographic parlance a "side channel" for conveying narrative-related information to a reader outside the primary communications stream. If a reader removes the digital watermark from the work, the side channel containing narrative-related information is destroyed, and the literary value of the work is thereby diminished.

The present method and apparatus replace a subset of an ELM's or KTT's HTML link-anchor values with a set of strings taken from unpublished portions of the ELM's or KTT's narrative text, encoded to remove redundancies that would cause collisions among the values produced, and stored as HTML link anchors embedded in Web pages comprising the ELM/KTT. The present method and apparatus also provide code to be executed by the reader's browser program which reconstructs and presents the unpublished portion of text to the reader, at the reader's selection of an appropriate link embedded in the ELM. The distributed narrative text comprises the watermark for the ELM/KTT.

In additional embodiments, the present method and apparatus identify elements of the ELM/KTT by using a text-substitution scheme similar to that proposed hereinabove, but extended to use filenames, pathnames, and other classes of identifiers as a means of storing concealed content of the ELM/KTT.

DETAILED DESCRIPTION OF THE INVENTION

Figure 1:
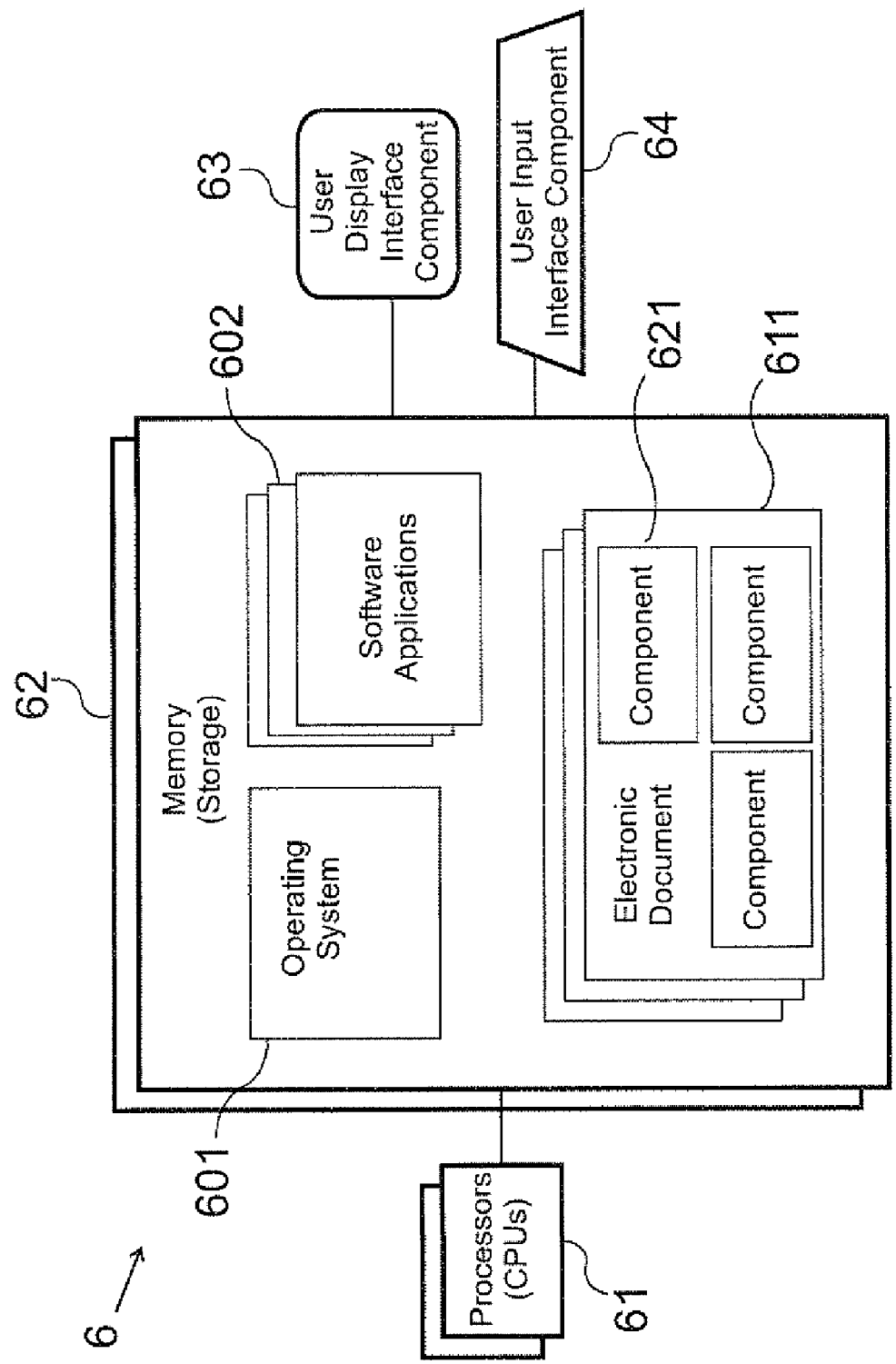
FIG. 1 shows the overview of the apparatus of the ELM/KTT.

See FIG. 1. The present apparatus comprises a computer system 6, made up of one or more processors (CPUs) 61, a user display interface component 63 such as a CRT, flat-panel display, or other viewing device, one or more user input interface components 64 such as a keyboard, a mouse, a touch panel, a scribing device such as a stylus, or some other pointing, selection, or data entry device, and one or more memory components 62. Any of the memory components 62 may hold an operating system 601, one or more software applications 602, and one or more electronic documents 611. Each electronic document 611 comprises a plurality of components 621.

The software applications 602 of the present apparatus comprise two hypertext linking programs: a first software application for encoding watermark information in one or more of said components of each said electronic document, and a second software application for decoding and presenting said watermark information in one or more of said components of each said electronic document.

The ELM and the KTT use HTML or XHTML to present an author's literary content. HTML and XHTML are markup languages which define the modes and manners of presentation of literary content. Such markup languages allow the storage of a great deal of information which is not presented to a reader as literary content. For example, HTML will reduce a string of space characters to a single space, so that information can be conveyed by varying the number of space characters from one interword gap to the next. The conveyance of such information in this manner is called "using a side channel". A second example of a side channel in HTML is the use of comments, enclosed between markup character strings "<!-" and "->", to convey literary content of a work. Such means of conveying literary content require the use of special programs to retrieve the content and display it for a reader. The present method and apparatus supply such programs in each embodiment.

In a first embodiment of the present method and apparatus, the author of an ELM/KTT supplies an additional content-bearing text of sufficient length to be divided up into unique identifying strings of characters. Each identifying string is then embedded in unused coding space in the ELM's or KTT's HTML files, one identifying string for each HTML link anchor to be created.

Conventionally, the HTML link anchor is a text string used by browsers to mark a point in a Web page to which a browser program may position said Web page for viewing or other use by a user of the browser. Such marking appears in one of two common forms: the string 'name="<anchor>"', or the string 'id="<anchor>"', where <anchor> is the link anchor text identifying the desired point in the Web page. To position the Web page to its anchor for viewing or other use, a user selects an HTML link, in the same or some other Web page, containing the name of the desired Web page and the identifier of the link anchor. The browser responds to the selection by accessing the named Web page and displaying or otherwise presenting the information at the position of the link anchor on the accessed Web page.

The text content of the link anchor identifier may be any alphanumeric string possibly containing one or more other special characters that do not affect the operation of HTML, e.g., an underscore ("_") There is no intrinsic meaning to the link anchor identifier's text string—one string of characters is as good as another, as long as each such string is unique among the strings in use in a Web page. The absence of intrinsic meaning allows the present method and apparatus to employ strings of its own devising, thereby embedding the information of the present method and apparatus in the link anchor strings being used. Taken as a unit, the information embedded in the link anchor text values comprises a watermark that identifies a set of copies of the ELM/KTT.

In a first encoded embodiment, the watermark of the present method and apparatus comprises a narrative text interlaced with numeric identifiers to insure uniqueness of each link anchor. A glossary-link version of the first embodiment of the present method and apparatus applies watermarking of the links to the ELM/KTT glossary only, which comprises the bulk of the links in the ELM/KTT. Each identifying string in the present method and apparatus constitutes a segment of text such that if all the segments were ordered and concatenated in that order, the original narrative text from which they were taken would become visible and readable. Since the glossary of an ELM/KTT may contain several thousand entries, there is sufficient space in the HTML link anchor names alone to store a significant amount of readable text in some encoded or unencoded form. The narrative text used is taken from writings created and selected by the author of the ELM/KTT.

The present method and apparatus provide for the reading of the watermark narrative as a text by the user of the browser. A special link offered to the reading user, when selected, leads to a Web page that executes JavaScript code to decode and assemble the watermark link anchors in readable form. Concealment or encoding of the process of finding and selecting the special link treats the watermark narrative as a kind of "Easter Egg": a hidden feature of a work which provides amusement and information when uncovered by a reader.

The watermarked link anchor text must be unique within any Web page in which it appears. To allow the browser to order and concatenate the link anchor strings, the present method and apparatus insert in each link anchor string a set of values in fixed positions which identify the containing anchor text string's relative position in the text sequence. To insure that the strings contain values acceptable for browser processing, the present method and apparatus recode all punctuation and other non-alphanumeric characters in the narrative text used into numeric values which may be easily decoded for presentation when the reader wishes to read the hidden text.

Figure 2:
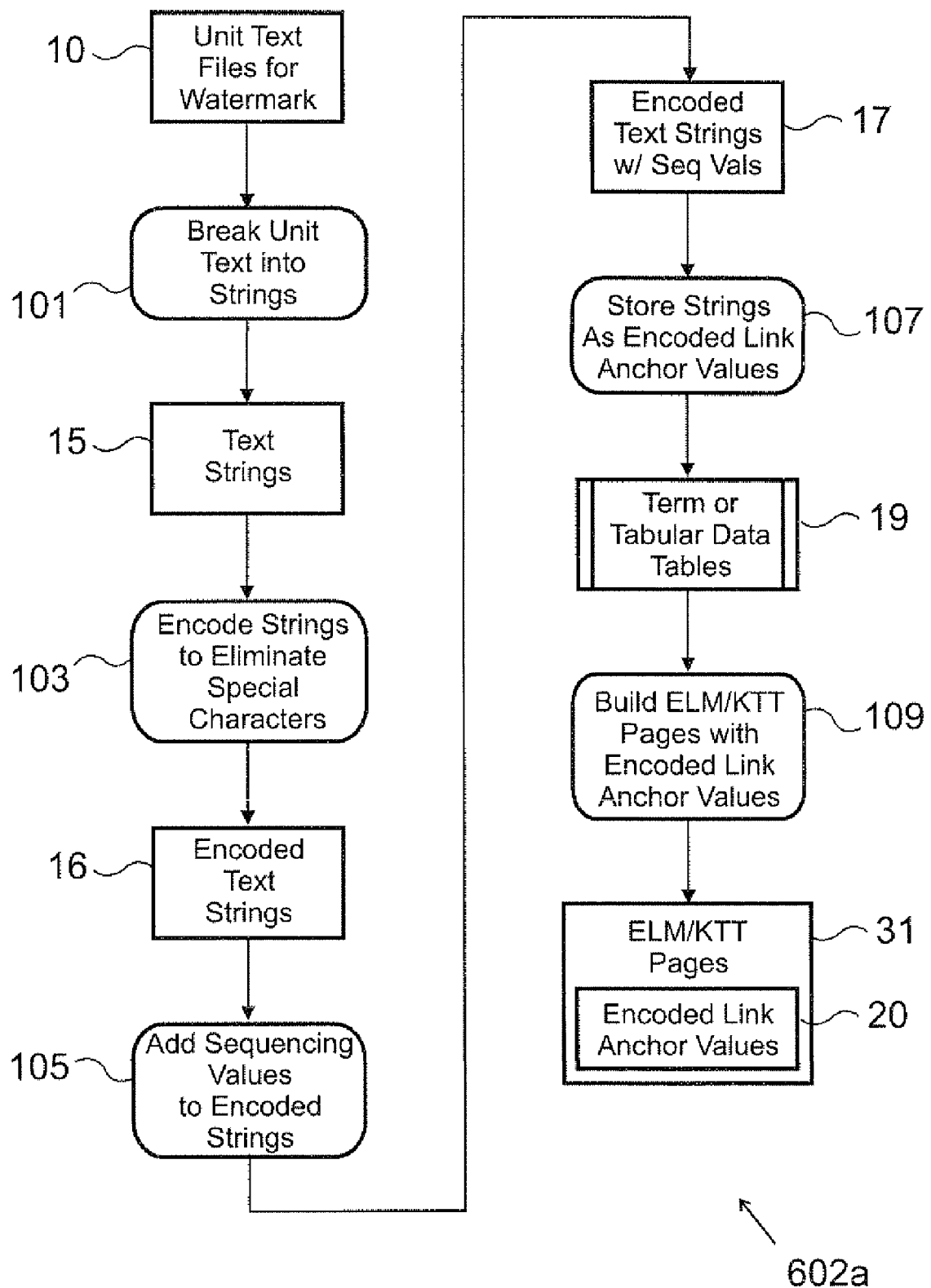
FIG. 2 shows the method of transforming narrative text into watermark information.

See FIG. 2 for the encoding software application 602a of the present method and apparatus. The present method and apparatus use as input a digital text 10 containing information of interest to a reader of an ELM/KTT. The present method and apparatus break up (101) the digital text 10 into a series of strings 15, and modify or encode (103) each string 15 to avoid the use of unconventional characters in HTML link anchor names, thereby producing encoded string 16. In a simple-encoding embodiment, all punctuation and spacing characters in string 15 are encoded into numeric values, accompanied by a signaling escape character, and the numeric valuesty are stored as text replacing the original unconventional characters. Ordinary alphanumeric characters are stored in encoded string 16 as themselves.

To each encoded string 16 the present method and apparatus add (105) a numeric index value in a fixed set of positions which collectively represent the relative position of the string in the input text, producing a link anchor identifier 17. The added index value may have its digits scattered or together, and may appear in any portion of the identifier 17 as long as it can be easily and reliably found, retrieved, and removed.

In step 107 the present method and apparatus store link anchor identifiers 17 as encoded link anchor values which serve as identifiers of locations in glossary, reference, or tabular text units, in the database tables 19 of the present method and apparatus defining and holding contents for such text units. From database tables 19 the present method and apparatus build (109) ELM/KTT glossary, reference, and tabular pages 31 for readers, each page containing embedded encoded link anchor values 20.

Figure 3:
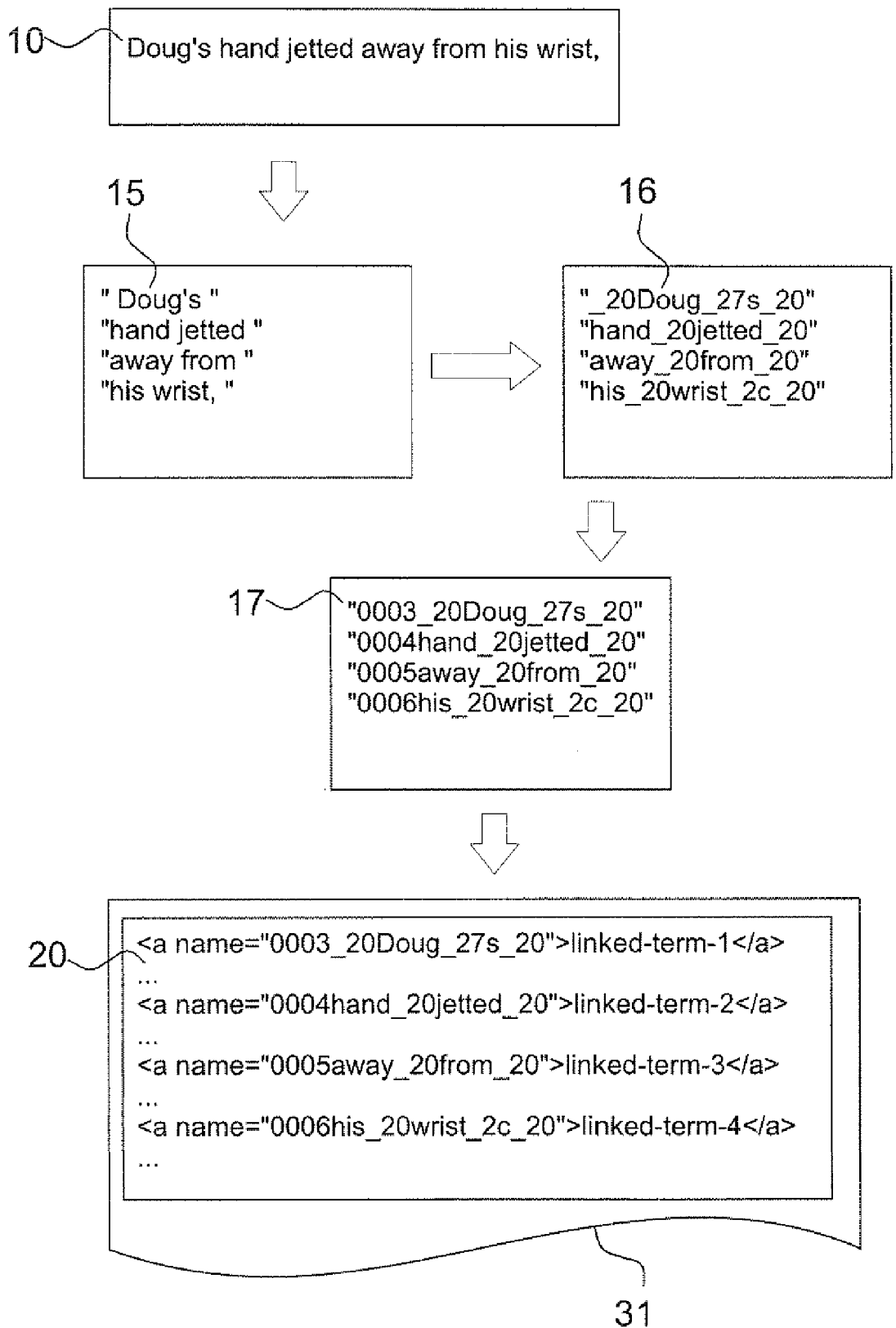
FIG. 3 illustrates the stages of transformation of narrative text to watermark information.

FIG. 3 illustrates the kinds of values that can appear at each stage of the process shown in FIG. 2, from text in a unit text file 10 all the way to encoded link anchor values 20 in an ELM/KTT page 31.

In an encrypted embodiment (not shown), the present method and apparatus may optionally encrypt or otherwise transform the input digital text 10 for the entertainment of readers or for restriction of access to the text by one or More classes of reader. Such encryption or transformation of digital text 10 produces no functional difference in the use of the link anchor identifiers 16 in HTML or XHTML. In such an encrypted embodiment, transposition, substitution, and other conventional encryption techniques may be used to map each encoded string 16 to an encrypted string which may be used instead of encoded string 16.

In a glossary-based embodiment of the present method and apparatus, every link to a glossary entry, including all links in the scenes/units, the references, and the glossary itself comprises a distinctive alphanumeric identifier 17 that may change value from one compilation of the ELM/KTT to the next. When the present method and apparatus generate the glossary, the link anchor entry contents become the anchor value for the corresponding term in the glossary, replacing the term itself as ordinarily used for the link anchor value. In said embodiment, all copies generated from the same compilation have the same link identifiers 17, but copies generated from different compilations of the ELM/KTT are mutually incompatible vis-a-vis the glossary links. Other embodiments may base link identifiers 17 in multiple glossaries, multiple references or tables, or any other combination of text units from which said identifiers may be usefully retrieved for the purposes of the present method and apparatus.

An ELM/KTT produces different outputs as an author or editor revises and corrects its content over time. In successive releases of ELM/KTT output of the present method and apparatus, new narrative texts may be used in place of earlier ones to comprise the link anchor contents, perhaps to offer previews of new material not yet published, while the earlier text used to derive HTML link anchor name values may be moved into the main body of the ELM/KTT. In a customizing embodiment, each distributed copy of an ELM/KTT may contain a unique input digital text 10, thereby associating said copy unambiguously with a specific buyer, lessor, or other receiving reader.

Figure 4:
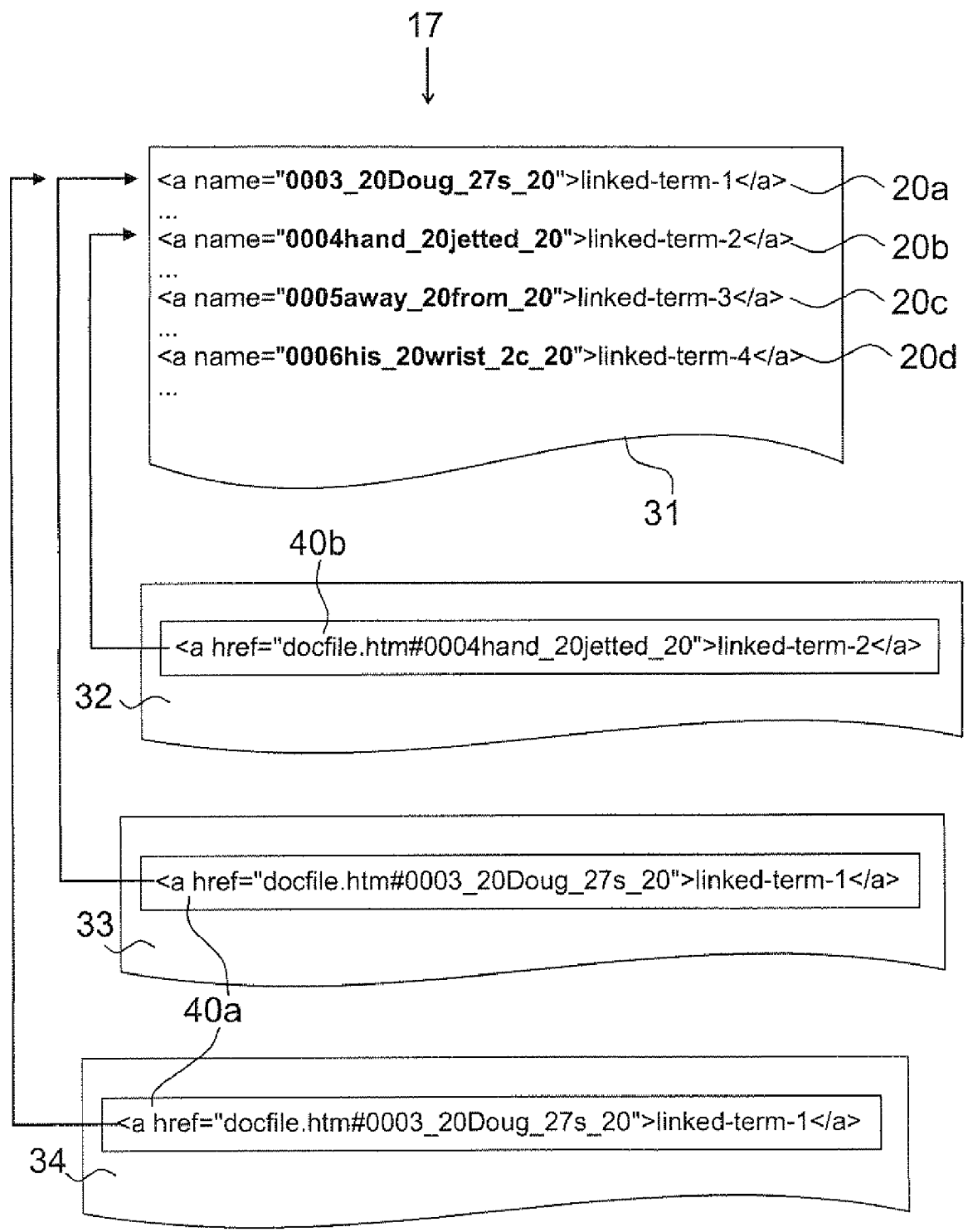
FIG. 4 shows the use of watermark information in hypertext links.

See FIG. 4. The present method and apparatus store all link anchor identifiers 17 in one or more ELM/KTT Web pages 31 to operate as anchors 20a-d for readers to use in linking to the pages and locations containing them. Links 40a, 40b in ELM/KTT Web pages 32, 33, and 34 link back to link anchors 20a, 20b respectively in Web page 31 to serve the reader's needs in selecting any of links 40a, 40b.

Note that since the link values themselves are not visible in the text of the work, they comprise no distraction or obstacle to the reader enjoying the work. But the present method and apparatus offer the curious reader a "side channel" that can be explored by delving into the HTML code of the Web page comprising each scene, or the HTML code of the glossary.

Figure 5:
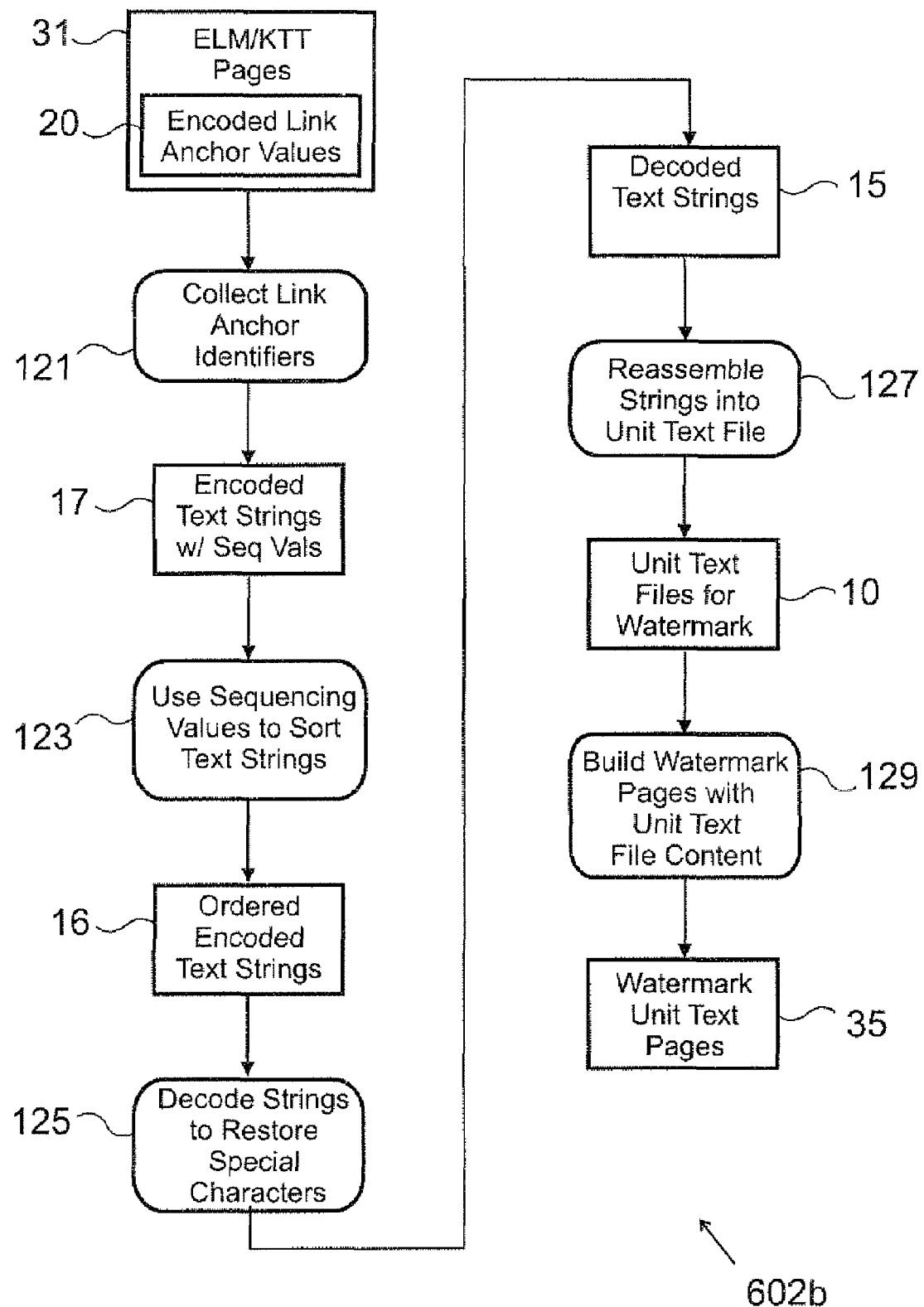
FIG. 5 shows the method of transforming watermark information into narrative text viewable as part of an ELM/KTT.

See FIG. 5 for the decoding software application 602b of the present method and apparatus. To recreate the original input text for display in a Web page 35, the present method and apparatus collect (121) all of the link anchors 20 to produce a list of link anchor identifiers 17, extract the sequencing index value from each link anchor name value to retrieve and sort (123) the identifiers 17 to produce the encoded string 16, replace (125) any encoded or encrypted characters in encoded string 16 with their original text values to produce string 15, concatenate all strings 15 to recreate the source text 10, mount the source text 10 in a Web page 35, and display Web page 35 to the reader.

Figure 6:
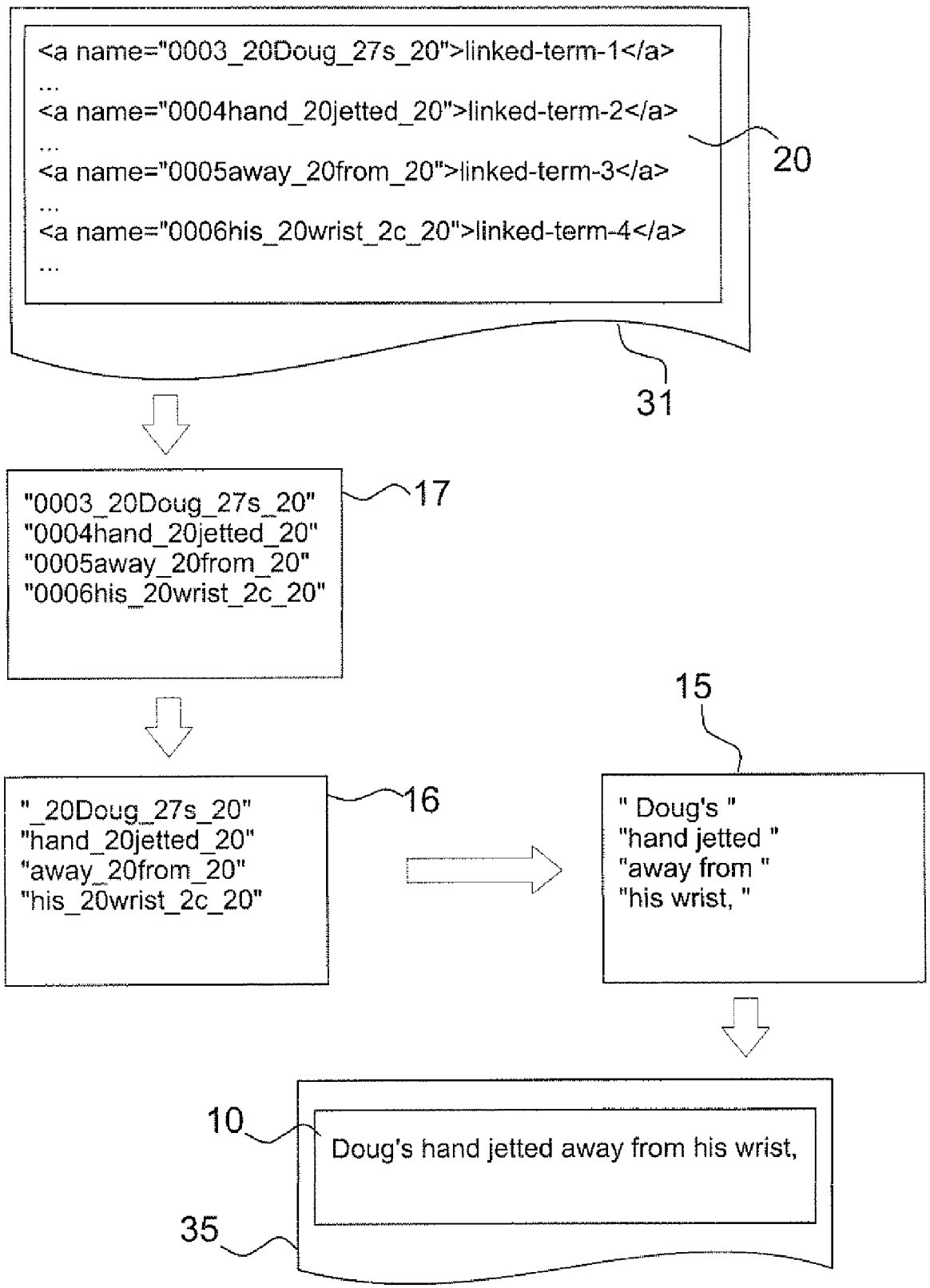
FIG. 6 shows the stages of reconstruction of the original narrative text from the hypertext links containing the watermark information, and the resulting ELM/KTT page.

FIG. 6 illustrates the kinds of values that can appear at each stage of the process shown in FIG. 5, from encoded link anchor values 20 in an ELM/KTT page 31 all the way to text in a in a watermark unit text page 35.

Readers are free to choose easier or harder ways to perform the extraction and reconstruction. The hard way is to use only the ELM's or KTT's narratives in the story pages. An easier way is to traverse the ELM/KTT pages containing the link anchors and pull out the link anchor name values one by one in order, decoding or decrypting them to build up the concealed watermark text. Different encryption embodiments of the present method and apparatus can be adjusted to scramble that order, or to encrypt the input text. Such adjustment serves two purposes. It offers the reader a more significant challenge, and it can enhance the protective value of the digital watermark.

Removal of the digital watermark described hereinabove is not a trivial exercise. Link-anchor values are scattered without pattern throughout the text of the ELM/KTT. Consequently, altering the link-anchor values comprising the digital watermark requires considerable time and effort. Furthermore, removal prevents the reader-initiated presentation of the concealed narrative information. Anyone wishing to preserve the ability to view the concealed narrative information in the manner of the present method and apparatus after watermark removal must replace the removed links. The primary difficulty with alteration of the link-anchor values is that each value must be changed to a functional link-anchor value in all places in the ELM/KTT where the link is used. The difficulty and inconvenience of removing the watermark renders such removal less attractive to readers, thereby enhancing the protection of the work afforded by watermarking it.

The present method and apparatus constitute an instance of a more-general class of inventions that use various HTML, XHTML, XML, or other markup components to embed and recover side-channel content-bearing information for readers of the work. Conventionally, markup components contain only presentation information. The present method and apparatus exploit unused or redundant coding space in electronic documents to convey literary content to a reader. This approach is analogous to the use of TCP/IP fields as side-channel bearers of application information in Internet communications protocols.

Illustration of Invention

An instance of the present method and apparatus contains an HTML-coded story text to be stored as described above, starting with:

<h3>OBERON</h3>
<p class="tdate">2416 CE</p>
<p class="story">Doug's hand jetted away from his wrist, the severed vessels spewing blood crystallizing into sparkles in the vacuum, his suit pressure alarm shrieking. Shit, another one gone. And the ring Jan gave me. He tourniquetted the suit sleeve; the alarm dropped to a mutter. The grind would dock him another two jolts of Met when he got back aboard the Can, just for taking the time in the regen hole. And no Met meant no sleep, the missing hand flaming his arm all the Uranian night.</p>
<p class="story">Four hundred meters might as well have been point-blank for Nye's laser. Nye, damn his pus-running ears, just couldn't keep his fingers off the trigger.</p>

The present method and apparatus remove the HTML features, leaving:

OBERON
2416 CE
Doug's hand jetted away from his wrist, the severed vessels spewing blood crystallizing into sparkles in the vacuum, his suit pressure alarm shrieking. Shit, another one gone. And the ring Jan gave me. He tourniquetted the suit sleeve; the alarm dropped to a mutter. The grind would dock him another two jolts of Met when he got back aboard the Can, just for taking the time in the regen hole. And no Met meant no sleep, the missing hand flaming his arm all the Uranian night.
Four hundred meters might as well have been point-blank for Nye's laser. Nye, damn his pus-running ears, just couldn't keep his fingers off the trigger.

The present method and apparatus then break up the text and encodes its non-alphanumeric characters into anchor character strings longer than a defined minimum length and ending in any of a set of characters common in text. Each anchor character string contains a watermark serial number and the characters of coded text. The above text is now in the form:

```
0001OBERON)_0D          0020tourniquetted_20    0039no_20sleep_2c_20
00022416_20CE_0D        0021the_20suit_20       0040the_20missing_20
0003_20Doug_27s_20      0022sleeve_3b_20        0041hand_20flaming_20
0004hand_20jetted_20    0023the_20alarm_20      0042his_20arm_20all_20
0005away_20from_20      0024dropped_20to_20     0043the_20Uranian_20
0006his_20wrist_2c_20   0025a_20mutter_2e_20    0044night_2e_0D
0007the_20severed_20    0026The_20grind_20      0045_20Four_20hundred_20
0008vessels_20spewing_20 0027would_20dock_20    0046meters_20might_20
0009blood_20crystallizing_20 0028him_20another_20 0047as_20well_20have_20
0010into_20sparkles_20  0029two_20jolts_20      0048been_20point_2dblank_20
0011in_20the_20vacuum_2c_20 0030of_20Met_20when_20 0049for_20Nye_27s_20
0012his_20suit_20       0031he_20got_20back_20  0050laser_2e_20
0013pressure_20         0032aboard_20the_20     0051Nye_2c_20damn_20
0014alarm_20shrieking_2e_20 0033Can_2c_20just_20 0052his_20pus_2drunning_20
0015Shit_2c_20another_20 0034for_20taking_20    0053ears_2c_20just_20
0016one_20gone_2e_20    0035the_20time_20       0054couldn_27t_20
0017And_20the_20ring_20 0036in_20the_20regen_20 0055keep_20his_20
0018Jan_20gave_20       0037hole_2e_20And_20    0056fingers_20off_20
0019me_2e_20He_20       0038no_20Met_20meant_20 0057the_20trigger_2e_0D
```

The first line (the scene title line), has its first segment encoded to:
0001OBERON_0D
which breaks down into:
0001: the four digits of the watermark serial number
OBERON: OBERON is the first word of the scene title.
_0D: escape character for a nonalphanumeric coded character, followed by the first character of a hexadecimal code for that character (in this case, a carriage return)

The watermark serial number is therefore 0001. The watermark itself is now used as the name anchor value for a glossary link. The first entry in the glossary of the ELM might be the assigned entry for the first watermark in the set generated by the present method and apparatus. Consequently the name anchor value for that glossary entry reads:
<a name="0001OBERON_0D"></a>

The uniqueness of the name anchor is assured by the inclusion of the unique watermark serial number, so that there can be no collisions of identical HTML name anchors. All browser links to the glossary entry having the above name anchor will operate by linking the reader to the entry's position in its Web page, e.g.,
<a href="0001OBERON_0D">glossary term</a>

The relative positions and encodings of the digits of the serial number, and the relative positions and encodings of the characters and substrings of the text of the link anchor, are selectable by the author, publisher, or editor, as long as they insure uniqueness and usability. Furthermore, the same link anchor text may be used in two different Web pages, since the presence of the Web page file name as part of a link reference disambiguates the names.

The present method and apparatus reconstruct the original text for reader enjoyment using browser-executable code such as JavaScript that removes the serial numbers and restores the non-alphanumeric characters to their original values. Furthermore, the browser-executable code can supply HTML commands to mark up the reconstructed text for ease of reading and consistency of presentation with the ELM/KTT.

Authors can make such programs available as they see fit. In successive releases of an ELM/KTT, different texts can be used to generate the anchor values, thereby distinguishing one ELM/KTT release from another via the differences in watermarks used in the two releases. In an advanced embodiment, the present method and apparatus provide for a unique watermark text for every copy of the ELM/KTT provided to an end user, thereby associating said copy with said user.

While the present method and apparatus have been described with reference to preferred embodiments, it will be understood by those skilled in the software and related arts hat various changes may be made and equivalents may be substituted for elements thereof to adapt to particular situations without departing from the scope of the present method and apparatus. Therefore, it is intended that the present method and apparatus not be limited to any particular embodiments or combination of embodiments disclosed as the basic, primary, or best mode contemplated for carrying out this present method and apparatus, but that the present method and apparatus will include all embodiments falling within the scope and spirit of the appended claims.

What is claimed:

1. A method of digitally watermarking an electronic document, comprising the steps of:
   converting the text of a first electronic document to watermark information stored in a second electronic document;
   adding a sequencing index value in a fixed set of positions to an encoded string to produce a link anchor identifier;
   storing link anchor identifiers as identifiers of locations in text units of the second electronic document in one or more identifier database tables;
   converting said watermark information to text comprising a component of said second electronic document; and
   wherein all of the steps above are performed by a computer.

2. The method of claim 1, wherein the step of converting the text of a first electronic document to watermark information stored in a second electronic document comprises the steps of:
   breaking up said text into a series of strings;
   encoding each said string using conventional characters in HTML link anchor names to produce an encoded string; and
   building from identifier database tables one or more electronic document pages for readers, wherein each page contains embedded encoded link anchor identifier values comprising watermark information.

3. The method of claim 2, further comprising the step of encrypting each said link anchor identifier to produce an encrypted link anchor identifier.

4. The method of claim 1, wherein the step of converting said watermark information to the text of a second electronic document comprises the steps of:
   collecting all of the link anchor identifiers to produce a list of link anchor identifiers;
   extracting the sequencing index value from each link anchor name value in the list of link anchor identifiers;
   retrieving and sorting the identifiers using said sequencing index value to produce an encoded list of identifiers;
   replacing any encoded characters in said encoded list of identifiers with their unencoded text values to produce a list of readable identifiers;
   replacing any encrypted characters in said encoded list of identifiers with their unencrypted text values to produce a list of readable identifiers;
   concatenating all identifiers in said list of readable identifiers to create the text of a component of the second electronic document; and
   mounting said text of the second electronic document in a component Web page and displaying said component Web page to a reader.

5. The method of claim 4, further comprising the step of decrypting each link anchor identifier in a list of identifiers to produce an unencrypted link anchor identifier.

6. A method for watermarking any of one or more copies of a literary work in electronic form, comprising the steps of:
   selecting a narrative text supplementary to the literary work;
   dividing the narrative text into narrative text segments;
   encoding each narrative text segment into a common encoded form;
   assigning a unique number to each encoded narrative text segment;
   combining the unique number and its assigned encoded narrative text segment into a hypertext link anchor identifier;
   selecting one or more narrative texts containing hypertext link anchor points;
   selecting one or more linking narrative texts containing hypertext links to said hypertext link anchor points;
   placing a unique hypertext link anchor identifier at each hypertext link anchor point;
   linking each linking narrative text to a hypertext link anchor point using the hypertext link anchor identifier;
   extracting all hypertext link anchor identifiers from the narrative texts containing the hypertext link anchor identifiers;
   decoding the extracted hypertext link anchor identifiers into the narrative text segments;
   assembling the narrative text segments into the narrative text supplementary to the literary work;
   displaying the narrative text supplementary to the work to a reader of the literary work in electronic form; and
   wherein all of the steps above are performed by a computer.

7. The method of claim 6, wherein the step of placing a unique hypertext link anchor identifier at each hypertext link anchor point further comprises the steps of:
   adding a numeric index value in a fixed set of positions to an encoded string to produce a link anchor identifier; and
   storing link anchor identifiers as identifiers of locations in text units of a second electronic document in one or more identifier database tables.

8. The method of claim 6, wherein the step of extracting all hypertext link anchor identifiers from the narrative texts containing the hypertext link anchor identifiers further comprises the steps of:
   collecting all of the link anchor identifiers to produce a list of link anchor identifiers; and
   extracting a sequencing index value from each link anchor name value in the list of link anchor identifiers.

9. The method of claim 6, wherein the step of decoding the extracted hypertext link anchor identifiers into the narrative text segments further comprises the step of retrieving and sorting the identifiers using said sequencing index value to produce an encoded list of identifiers.

10. An apparatus for digitally watermarking an electronic document for degrading the content of the document if the watermark is altered or removed, comprising:
    a computer system, further comprising one or more processors, a user display interface component, one or more user input interface components, and one or more memory components for holding an operating system, one or more software applications, and one or more electronic documents each comprising a plurality of components;

a first software application converting the text of a first electronic document to watermark information stored in a second electronic document;

a second software program adding a sequencing index value in a fixed set of positions to an encoded string to produce a link anchor identifier;

a third software program storing link anchor identifiers as identifiers of locations in text units of the second electronic document in one or more identifier database tables; and a fourth software application converting said watermark information to text comprising a component of said second electronic document.

11. The apparatus of claim 10, wherein the second electronic document comprises an electronic literary macramé (ELM) component with text, glossary, and a reference hyperlinked to each other wherein the glossary defines terms in the text and the reference explains the terms, said text having linked scenes and multiple points of view, each point of view comprising a plurality of sequential scenes wherein said points of view overlap at one or more scenes.

12. The apparatus of claim 10, wherein the second electronic document comprises a knowledge transfer tool (KTT) component.

13. The apparatus of claim 10, wherein the second electronic document further comprises:
  one or more narrative components;
  one or more reference components;
  one or more glossary components; and
  one or more index components.

14. The apparatus of claim 10, wherein the software program for converting the text of a first electronic document to watermark information comprises:
  a software program breaking up said text into a series of strings;
  a software program encoding each said string using conventional characters in HTML link anchor names to produce an encoded string; and
  a software program building from identifier database tables one or more electronic document pages for readers, wherein each page contains embedded encoded link anchor identifier values comprising watermark information.

15. The apparatus of claim 14, further comprising a software program encrypting each said link anchor identifier to produce an encrypted link anchor identifier.

16. The apparatus of claim 14 wherein the conventional characters comprise letters, numbers and underscores.

17. The method of claim 2 wherein the conventional characters comprise letters, numbers and underscores.

18. The apparatus of claim 10, wherein the software program converting said watermark information to the text of a second electronic document comprises:
  a software program collecting all of the link anchor identifiers to produce a list of link anchor identifiers;
  a software program extracting the sequencing index value from each link anchor name value in the list of link anchor identifiers;
  a software program retrieving and sorting the identifiers using said sequencing index value to produce an encoded list of identifiers;
  a software program replacing any encoded characters in said encoded list of identifiers with their unencoded text values to produce a list of readable identifiers;
  a software program replacing any encrypted characters in said encoded list of identifiers with their unencrypted text values to produce a list of readable identifiers;
  a software program concatenating all identifers in said list of readable identifiers to create the text of the second electronic document; and
  a software program mounting said text of the second electronic document in a Web page and displaying said Web page to a reader.

19. The apparatus of claim 18, further comprising a software program decrypting each link anchor identifier in a list of identifiers to produce an unencrypted link anchor identifier.

* * * * *